US012416562B2

(12) United States Patent
Son (10) Patent No.: US 12,416,562 B2
(45) Date of Patent: Sep. 16, 2025

(54) LIGHT-SCATTERING FINE DUST MEASUREMENT APPARATUS

(71) Applicant: GONGGAM SENSORS CO., LTD., Daejeon (KR)

(72) Inventor: Myunghee Son, Daejeon (KR)

(73) Assignee: GONGAM SENSORS CO., LTD., Daejeon (KR)

( * ) Notice: Subject to any disclaimer, the term of this patent is extended or adjusted under 35 U.S.C. 154(b) by 139 days.

(21) Appl. No.: 17/758,765

(22) PCT Filed: Jul. 26, 2021

(86) PCT No.: PCT/KR2021/009656
§ 371 (c)(1),
(2) Date: Jul. 13, 2022

(87) PCT Pub. No.: WO2022/030843
PCT Pub. Date: Feb. 10, 2022

(65) Prior Publication Data
US 2023/0044367 A1    Feb. 9, 2023

(30) Foreign Application Priority Data

Aug. 6, 2020  (KR) .................. 10-2020-0098351
Jul. 15, 2021  (KR) .................. 10-2021-0093052

(51) Int. Cl.
*G01N 15/06*  (2024.01)
*G01N 1/22*  (2006.01)
(Continued)

(52) U.S. Cl.
CPC .......... *G01N 15/06* (2013.01); *G01N 1/2273* (2013.01); *G01N 1/44* (2013.01); *G01N 15/075* (2024.01); *G01N 2201/0238* (2013.01)

(58) Field of Classification Search
CPC .. G01N 15/06; G01N 15/075; G01N 15/0211; G01N 1/2273
See application file for complete search history.

(56) References Cited

U.S. PATENT DOCUMENTS

| 2009/0226156 A1* | 9/2009 | Heinrich | ................... F24H 9/02 |
| | | | 392/488 |
| 2017/0115196 A1* | 4/2017 | Tsuboi | ............... G01N 15/1459 |
| 2020/0209132 A1* | 7/2020 | Kelly | ..................... G01N 15/06 |

FOREIGN PATENT DOCUMENTS

| CN | 107036946 | * | 8/2017 | ............. G01N 15/06 |
| CN | 108872033 A | * | 11/2018 | ............. G01N 15/06 |

(Continued)

*Primary Examiner* — Uzma Alam
*Assistant Examiner* — Justin J Van Cleave
(74) *Attorney, Agent, or Firm* — Quantum Patent Law Firm; Seongyoune Kang (57) ABSTRACT

A light scattering particulate matter measuring apparatus is disclosed. The light scattering particulate matter measuring apparatus according to the present invention comprises: a casing provided with an inlet into which outside air flows and an outlet through which is exhausted measured air of which the particulate matter concentration has been measured; an airflow pathway which connects the inlet and the outlet in the casing and along which outside air moves; and an external temperature-humidity sensor which is provided on the outside of the casing and measures the temperature and relative humidity of outside air.

10 Claims, 8 Drawing Sheets

(51) Int. Cl.
*G01N 1/44* (2006.01)
*G01N 15/075* (2024.01)

(56) References Cited

FOREIGN PATENT DOCUMENTS

| | | | | |
|---|---|---|---|---|
| CN | 110631970 A | * | 12/2019 | ............. G01N 15/06 |
| EP | 3561482 A1 | * | 10/2019 | ........... G01F 15/022 |
| KR | 1014996720000 B1 | | 3/2015 | |
| KR | 101832100 B1 | * | 4/2018 | ............. G01N 15/02 |
| KR | 1018321000000 B1 | | 4/2018 | |
| KR | 101499672 B1 | * | 11/2018 | ............... G01N 1/22 |
| KR | 20200092629 A | * | 8/2020 | ............. G01N 15/02 |
| KR | 1020200092629 A | | 8/2020 | |

* cited by examiner

LIGHT-SCATTERING FINE DUST MEASUREMENT APPARATUS

CROSS-REFERENCE TO RELATED APPLICATIONS

This patent application is a U.S. national stage application of International Application No. PCT/KR2021/009656, filed Jul. 26, 2021 and the entire contents of which are incorporated herein by reference, which claims priority to KR 10-2020-0098351, filed Aug. 6, 2020 and KR 10-2021-0093052, filed Jul. 15, 2021, the entire contents of which are incorporated herein by reference.

TECHNICAL FIELD

The present invention relates to particulate matter measuring apparatus and, more specifically, to particulate matter measuring apparatus capable of accurately measuring the concentration of particulate matter contained in the air by using a light scattering particulate matter sensor.

BACKGROUND ART

A light scattering method particulate matter measuring apparatus is used to measure the concentration of particulate matter in the air. In a light scattering particulate matter measuring apparatus, a monochromatic beam is directed to the particle and then a detector records the scattered light at a certain angle.

In general, a conventional light scattering particulate matter measuring apparatus includes a plurality of detectors for detecting lights scattered by aerosol particles and measures the concentration of particulate matter by averaging the measured values during standard time.

However, when the relative humidity in the air is increased, water vapor condenses on hygroscopic particulate matter surfaces readily and then the particulate matter is deliquescent. Water adsorption onto and absorption by aerosol particles increases their size.

That is, the higher the relative humidity, the larger the particle size of the hygroscopic particulate matter. So, the conventional light scattering particulate matter measuring apparatus may mistake fine particulate matter for particulate matter, and the particulate matter increased in size is not measured as particulate matter since being considered the coarse particulate matter.

The above-described light scattering particulate matter measuring apparatus can measure in real time and is inexpensive, but has a disadvantage in that the measurement value according to the relative humidity is low in accuracy as mentioned above.

Therefore, a light scattering particulate matter measuring apparatus for controlling the relative humidity of introduced air using a heater has been developed. However, the light scattering particulate matter measuring apparatus using a heater requires a vacuum pump to introduce ambient air thereinto since an inlet is arranged at the uppermost portion, requires lots of time and energy since lowering the relative humidity in an indirect heating method, and is bulky.

Furthermore, the light scattering particulate matter measuring apparatus has another disadvantage in that even if the relative humidity is known, the concentration of particulate matter cannot be predicted and corrected because the composition of particulate matter differs from place to place and hygroscopic properties are different depending on the composition of particulate matter.

Additionally, the conventional light scattering particulate matter measuring apparatus has a disadvantage in that the particulate matter contained in the air introduced through the inlet adheres to the inlet by static electricity and thus cannot accurately measure the concentration.

DISCLOSURE

Technical Problem

Accordingly, the present invention has been made in view of the above-mentioned problems occurring in the related art, and it is an object of the present invention to provide a light scattering particulate matter measuring apparatus capable of accurately measuring an amount of particulate matter contained in the air in a light scattering method regardless of relative humidity in the air.

It is another object of the present invention to provide a light scattering particulate matter measuring apparatus capable of improving accuracy in particulate matter measurement by minimizing generation of static electricity.

Technical Solution

To accomplish the above-mentioned objects, according to the present invention, there is provided a light scattering particulate matter measuring apparatus including: a casing provided with an inlet into which outside air flows, and an outlet through which measurement air of which the particulate matter concentration has been measured is discharged; an airflow passage which connects the inlet and the outlet in the casing and through which outside air moves; an external temperature-humidity sensor disposed outside the casing to measure temperature and relative humidity of the outside air; a heater disposed on the airflow passage near the inlet.

In this instance, the light scattering particulate matter measuring apparatus further includes: a light scattering particulate matter sensor disposed on the airflow passage between the heater and the outlet to measure particulate matter concentration of the measurement air that flows through the heater; and an internal temperature-humidity sensor disposed on the airflow passage between the heater and the light scattering particulate matter sensor to measure temperature and relative humidity of the measurement air.

Advantageous Effects

The light scattering particulate matter measuring apparatus according to the present invention is capable of lowering relative humidity and increasing accuracy in concentration measurement of particulate matter by heating outside air by a heater when the relative humidity of the outside air is high.

In addition, an antistatic layer is formed on the inner wall surface of the airflow passage through which the outside air flows, or the airflow passage is made of an antistatic material. Accordingly, the light scattering particulate matter measuring apparatus according to the present invention can prevent particulate matter from sticking to the inflow passage due to static electricity, thereby solving the problem that there is an error in the particulate matter measurement result.

Additionally, the light scattering particulate matter measuring apparatus according to the present invention has the insulation layer formed on the inner wall surface of the sensing passage extending from the heater to the light scattering particulate matter sensor, thereby minimizing heat loss of the measured air having increased temperature, and securing reliability in the measurement result of the particulate matter concentration.

EXPLANATION OF REFERENCE NUMERALS

100: light scattering particulate matter measuring apparatus 110: casing
111: inlet block 111a: inlet
113: outlet block 113a: outlet
113b: first fastening member 115: heating block
115a: second fastening member 117: sensing block
119: spacer 120: airflow passage
121: inflow passage 121a: antistatic layer
123: heating passage 124: connection passage
125: sensing passage 125a: insulation layer
127: outlet passage 130: heater
140: external temperature-humidity sensor 150: internal temperature-humidity sensor
160: light scattering particulate matter sensor 170: air flow fan
180: control unit 181: connector
A1: outside air
A2: measurement air
T1: external temperature
T2: internal temperature
Tt: target temperature
W1: external relative humidity
W2: internal relative humidity
Wt: target relative humidity

MODE FOR INVENTION

Hereinafter, preferred embodiments of the present invention will now be described in detail with reference to the attached drawings, in which like reference numbers denote corresponding parts throughout the drawings.

The terms "comprising" and "including" in the discussion directed to the present invention and the claims are used in an open-ended fashion and thus should be interrupted to mean "including", but not limited thereto.

Figure 1:
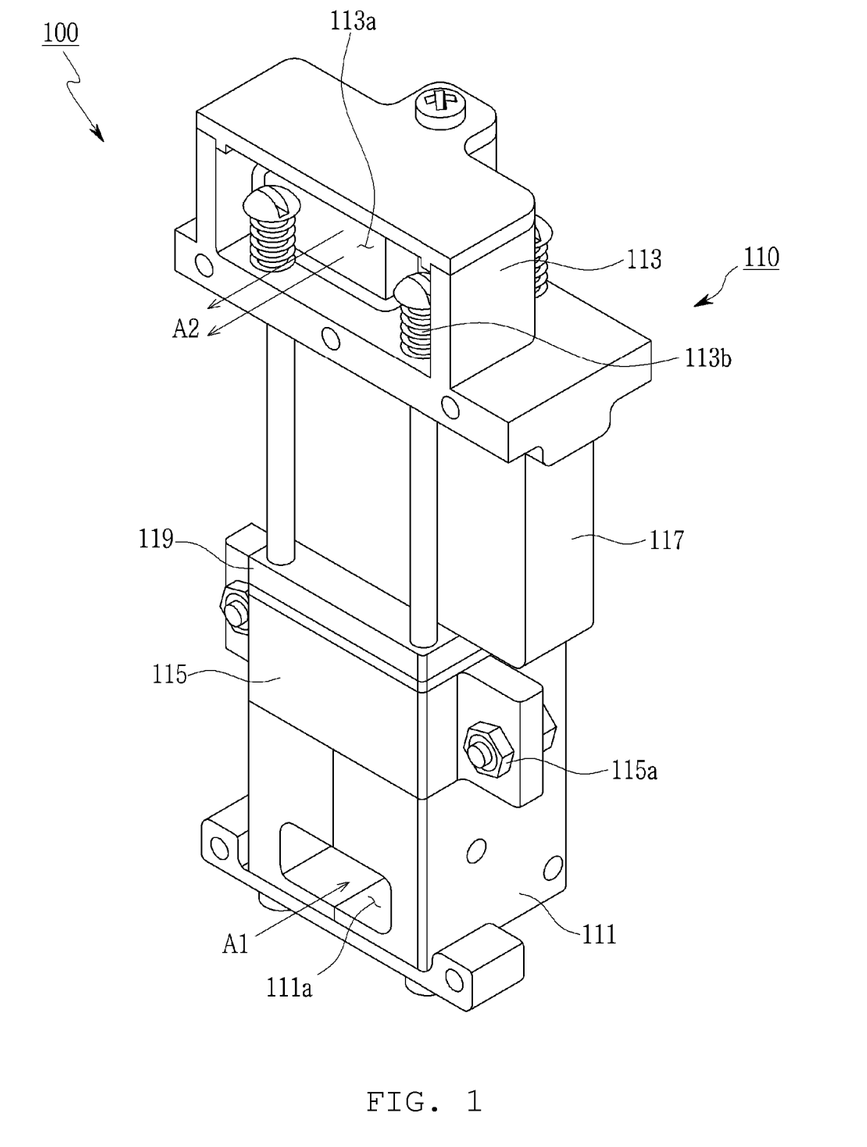
FIG. 1 is a perspective view illustrating a configuration of a light scattering particulate matter measuring apparatus according to a preferred embodiment of the present invention.
Figure 2:
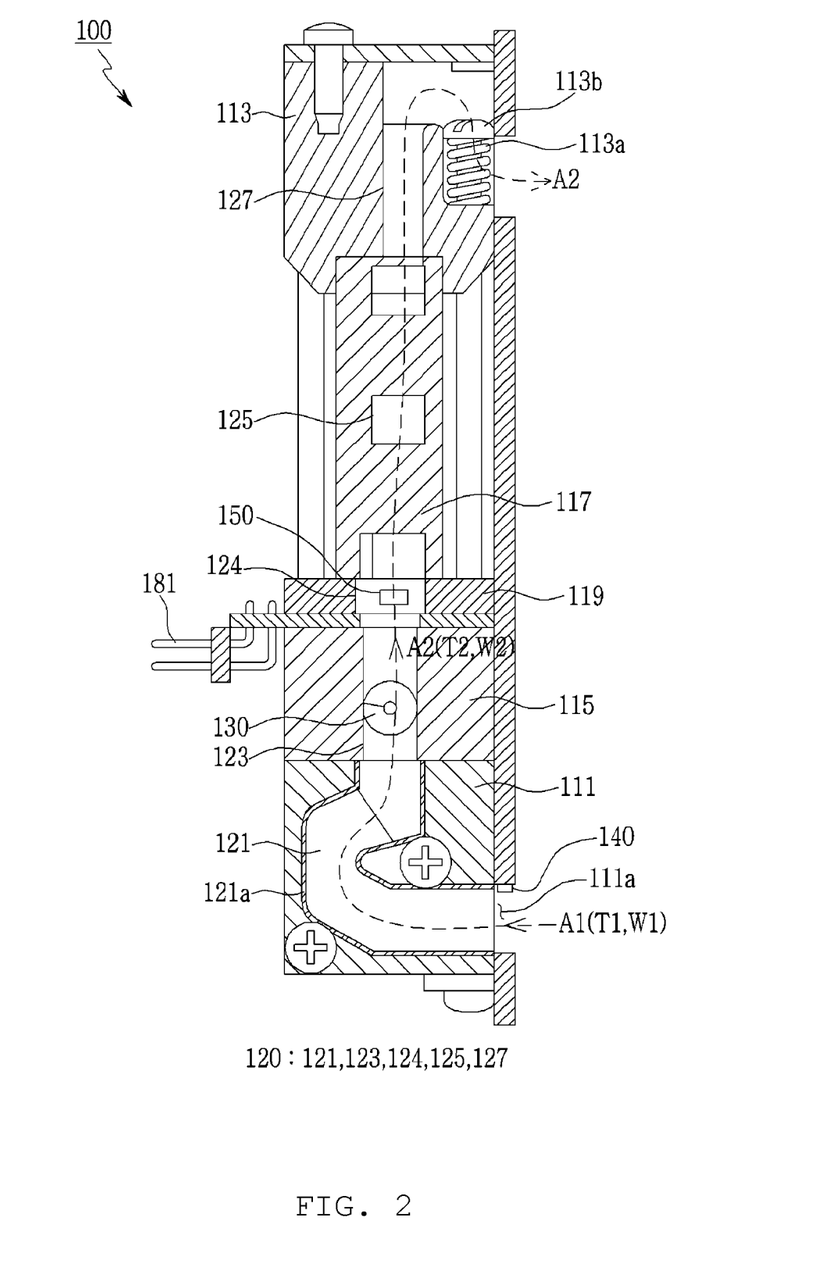
FIG. 2 is a side cross-sectional view of the light scattering particulate matter measuring apparatus according to the preferred embodiment of the present invention.
Figure 3:
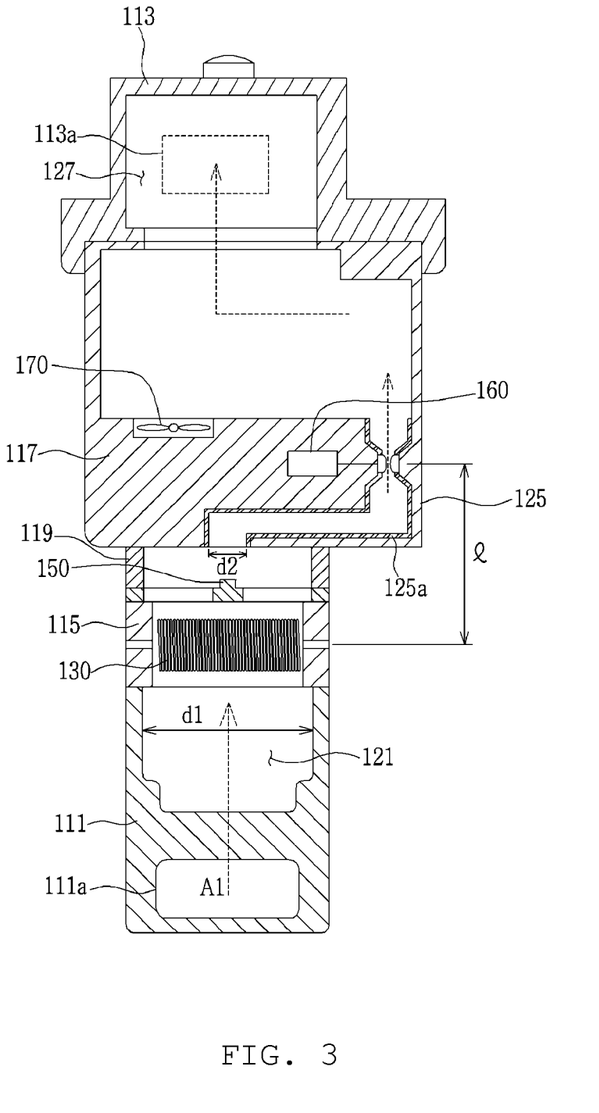
FIG. 3 is a front cross-sectional view of the light scattering particulate matter measuring apparatus according to the preferred embodiment of the present invention.
Figure 4:
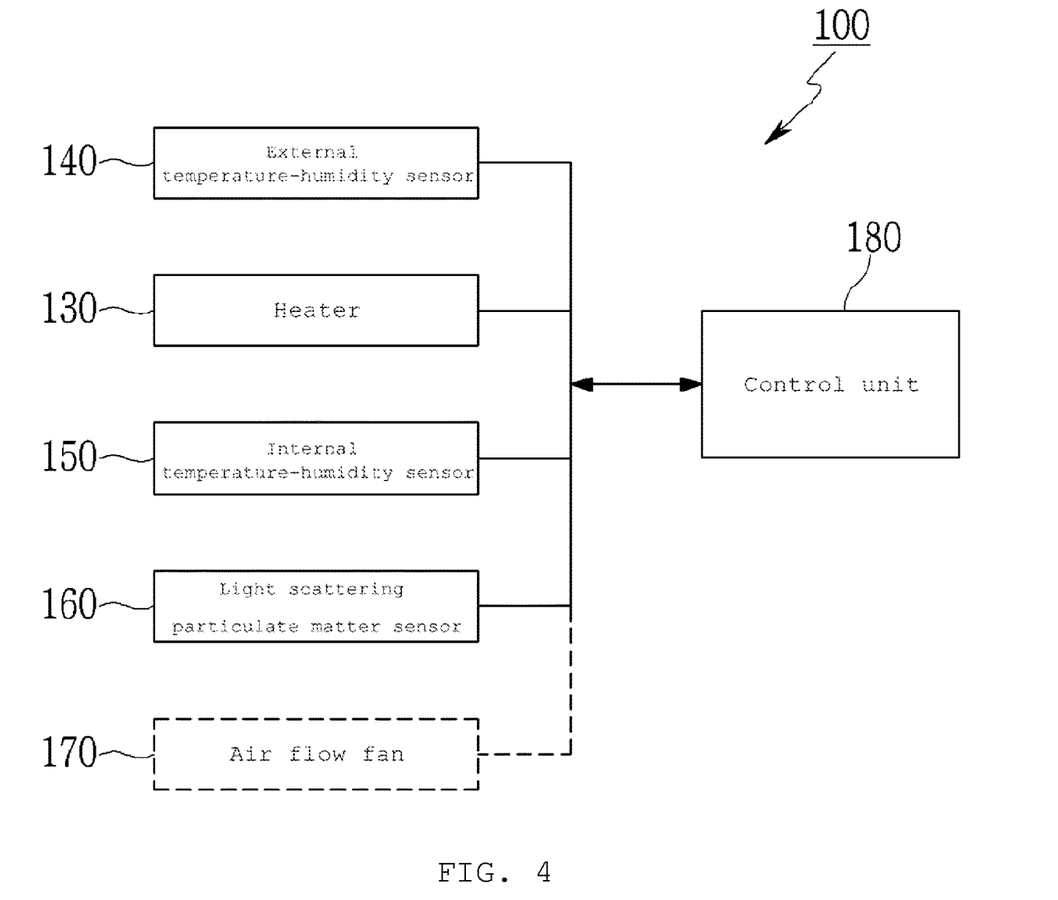
FIG. 4 is a block diagram schematically illustrating a configuration of the light scattering particulate matter measuring apparatus according to the preferred embodiment of the present invention.

FIG. 1 is a perspective view illustrating a configuration of a light scattering particulate matter measuring apparatus 100 according to a preferred embodiment of the present invention, FIG. 2 is a side cross-sectional view of the light scattering particulate matter measuring apparatus 100 according to the preferred embodiment of the present invention, FIG. 3 is a front cross-sectional view of the light scattering particulate matter measuring apparatus 100 according to the preferred embodiment of the present invention, and FIG. 4 is a block diagram schematically illustrating a configuration of the light scattering particulate matter measuring apparatus 100 according to the preferred embodiment of the present invention.

As illustrated in the drawings, the light scattering particulate matter measuring apparatus 100 according to the preferred embodiment of the present invention includes: a casing 110 having an inlet 111a through which outside air A1 flows and an outlet 113a through which measurement air A2 is discharged; an airflow passage 120 which connects the inlet 111a and the outlet 113a inside the casing 110 and guides the outside air to be discharged out after concentration of particulate matter is measured; a heater 130 provided on the inlet 111a; an external temperature-humidity sensor 140 disposed outside the casing 110 to measure temperature and relative humidity of the outside air; an internal temperature-humidity sensor 150 disposed above the heater 130 to measure temperature and relative humidity of the measurement air A2 heated by the heater 130; a light scattering particulate matter sensor 160 disposed between the internal temperature-humidity sensor 150 and the outlet 113a to measure the particulate matter concentration of the measurement air A2 in a light scattering method; and a control unit 180 selectively operating the heater 130 according to the relative humidity of the outside air A1 measured by the external temperature-humidity sensor 140 to reduce the relative humidity of the outside air A1.

As illustrated in FIG. 2, the outside air A1 is supplied from the outside of the casing 110 through the inlet 111a, and has external temperature T1 and external relative humidity W1.

The measurement air A2 gets in contact with the light scattering particulate matter sensor 160 and refers to air in which the particulate matter concentration is measured, and has internal temperature T2 and internal relative humidity W2.

The measurement air A2 may have the same temperature and relative humidity as the outside air A1 according to the relative humidity of the outside air A1 (T1=T2, W1=W2), or the outside air A1 may be heated by the heater 130 (T2>T1, W2<W1).

In the light scattering particulate matter measuring apparatus 100 according to the present invention, the heater 130 selectively heats the outside air A1 according to the relative humidity of the outside air A1 to lower the relative humidity of the outside air A1, thereby improving accuracy in particulate matter measurement with respect to the measured air A2.

The casing 110 supports each of the components so that the particulate matter concentration can be measured by the light scattering particulate matter sensor 160 after the outside air A1 is introduced. The casing 110 includes an inlet block 111 having an inlet 111a, an outlet block 113 having an outlet 113a, a heating block 115 in which the heater 130 is accommodated, a sensing block 117 in which the light scattering particulate matter sensor 160 is accommodated, and a spacer 119 disposed between the heating block 115 and the sensing block 117 to support the internal temperature-humidity sensor 150.

The airflow passage 120 is formed in the casing 110 and connects the inlet 111a and the outlet 113a to form a closed path. As illustrated in FIGS. 2 and 3, the airflow passage 120 includes an inflow passage 121 guiding the outside air A1 introduced into the inlet 111a to the heating block 115, a heating passage 123 formed in the heating block 115 to guide the outside air A1 to flow to the spacer 119 after passing through the heater 130, a connection passage 124 guiding the measurement air A2 passing through the internal temperature-humidity sensor 150 to an inlet of the sensing block 117, a sensing passage 125 formed in the sensing block 117 to guide the measurement air A2 passing through the light scattering particulate matter sensor 160 to the outlet block 113, and an outlet passage 127 formed in the outlet block 113 to guide the measurement air A2 passing through the sensing passage 125 to the outlet 113a.

The inlet block 111 is arranged at the lowermost portion of the casing 110 to allow the outside air A1 to flow into the casing 110. The light scattering particulate matter measuring apparatus 100 according to a preferred embodiment of the present invention has a structure in which the inlet 111a is located at a lower portion thereof and the outlet 113a is located at an upper portion thereof. In addition, the heater 130, the internal temperature-humidity sensor 150, and the light scattering particulate matter sensor 160 are sequentially arranged upward from the lower portion along the airflow passage 120 ranging from the inlet 111a to the outlet 113a.

Accordingly, even though there is no driving force, such as a vacuum pump, that consumes a large amount of energy for introducing the outside air A1 by forcedly forming negative pressure therein, the outside air A1 may be naturally introduced by the convection phenomenon of the air heated by the heater 130, and then, can flow upward to be moved to the heating passage 115.

A small-sized air flow fan 170 for discharging the measurement air A2 to the outside through the sensing block 117 is preferably provided in a route from the heating passage 115 to the outlet 113a. The small-sized air flow fan 170 is combined with the sensing block 117 to create an air flow through which the measurement air A2 can be discharged to the outside. In this instance, it is preferable that the small-sized air flow fan 170 is provided in a form in which a flow meter capable of measuring a flow rate of the measuring air A2 moving inside is combined integrally.

In FIG. 2, the inlet 111a is formed on the front surface of the inlet block 111, and the inflow passage 121 is formed in a curved shape inside the inlet block 111 to prevent the heater 130 from being exposed to the outside. In general, since the light scattering particulate matter measuring apparatus 100 is installed outdoors, it is preferable that the inflow passage 121 is formed in a curved shape or a complicated shape that is vertically winding so as not to come into contact with the heater 130.

Here, in order to prevent particulate matter contained in the outside air A1 introduced into the inlet 111a from being adhered onto the inner wall surface by static electricity, the inflow passage 121 has an antistatic layer 121a formed on the inner wall surface thereof.

The antistatic layer 121a may be formed by coating a material with a predetermined thickness having an antistatic function that does not generate static electricity so that particulate matter contained in the outside air A1 is not adhered onto the inner wall surface of a pipeline of the inflow passage 121 by static electricity. The material having an antistatic function may be one among various known materials.

The antistatic layer 121a may be formed on the heating passage 123, the connection passage 124, and the sensing passage 125 as well as the inflow passage 121.

In addition, without forming the antistatic layer 121a, the inlet block 111, the heating block 115, the spacer 119, and the sensing block 117 may be made of a material having the antistatic function.

The heating block 115 is combined with an upper portion of the inlet block 111 and accommodates the heater 130 therein. A heating passage 123 is formed inside the heating block 115 to communicate with the inflow passage 121 and the connection passage 124. The heating block 115 is combined with the inlet block 111 by a second fastening member 115a.

The heater 130 is selectively operated by the control of the control unit 180 and heats the outside air A1 that flows along the heating passage 123. As illustrated in FIG. 3, the heater 130 is provided to correspond to the entire width of the heating passage 123 and gets in contact with the outside air A1 that flows along the heating passage 123. The heater 130 is provided as a hot wire coil wound several times along the width of the heating passage 123 to increase a contact area with the outside air A1 to heat the outside air A1 in a short time.

The width of the heating passage 123 is equal to or wider than the inflow passage 121 so as to maximize the contact area between the heater 130 and the outside air A1. When the width of the heating passage 123 is wider than the width W1 of the inflow passage 121, a flow rate of the outside air A1 is slowed and contact time with the heater 130 is increased, thereby enabling more efficient heating.

The spacer 119 is arranged between the heating block 115 and the sensing block 117 so that the internal temperature humidity sensor 150 is spaced apart from the light scattering particulate matter sensor 160. The connection passage 124 is formed inside the spacer 119, and the internal temperature-humidity sensor 150 is arranged inside the connection passage 124.

The spacer 119 is positioned between the heating block 115 and the sensing block 117 to prevent the internal temperature-humidity sensor 150 from blocking an entrance of the light scattering particulate matter sensor 160 and hindering a smooth flow of the air when the measurement air A2 moved from the heating passage 123 is moved to the sensing passage 125 via the internal temperature humidity sensor 150.

As illustrated in FIG. 2, the external temperature-humidity sensor 140 is provided at one side of the inlet 111a to measure external temperature T1 and external relative humidity W1 of the outside air A1 flowing into the inlet 111a. According to the control of the control unit 180, the external temperature-humidity sensor 140 can measure either the external temperature or the external relative humidity, or can measure both the external temperature and the external relative humidity.

As illustrated in FIG. 3, the internal temperature-humidity sensor 150 is arranged in a boundary area between the heating passage 123 and the sensing passage 125 to measure the internal temperature T2 or the internal relative humidity W2 of the measurement air A2 passing through the heater 130.

Although not illustrated in the drawings, the external temperature-humidity sensor 140 and the internal temperature-humidity sensor 150 are electrically connected to the control unit 180 to transmit the external temperature, the external relative humidity, the internal temperature, and the internal relative humidity, which have been measured, to the control unit 180.

The sensing block 117 is disposed above the inlet block 111 and has the sensing passage 125 formed therein. The sensing passage 125 is provided with the light scattering particulate matter sensor 160 to measure the concentration of particulate matter contained in the measurement air A2 that flows along the sensing passage 125.

Here, it is preferable that the sensing passage 125 is designed in such a way that the measurement air A2 heated to lower the relative humidity in the heater 130 maintains the heated internal temperature T2 and can get in contact with the light scattering particulate matter sensor 160.

Therefore, the sensing passage 125 according to the preferred embodiment of the present invention is designed such that the width D2 of the pipeline gets significantly narrower than the width D1 of the heating passage 123 as illustrated in FIG. 3, thereby rapidly controlling the flow rate of the measurement air A2 moved along the sensing passage 125.

Accordingly, the measured air A2 heated by the heater 130 which raises the temperature of the measured air A2 to the internal temperature T2, flows quickly while maintaining the internal temperature and contacts with the light scattering particulate matter sensor 160. Thus, a more accurate particulate matter concentration measurement value can be obtained.

In addition, insulation layers 125a are respectively formed on inner wall surfaces of the heating block 115, the spacer 119, and the sensing passage 125, or the heating block 115, the spacer 119, and the sensing passage 125 are made of an insulation material to minimize a heat loss of the measurement air A2 so that the measurement air A2 flows while maintaining the internal temperature.

Moreover, it is preferable that the sensing passage 125 is designed such that a distance L between the heater 130 and the light scattering particulate matter sensor 160 is shortened so that the measurement air A2 can rapidly come into contact with the light scattering particulate matter sensor 160 while minimizing the heat loss of the measurement air A2.

Since the width of the sensing passage 125 after the light scattering particulate matter sensor 160 is no longer relevant to the sensing accuracy, the width of the pipeline is adjusted according to the width of the sensing block 117. Furthermore, since the temperature or relative humidity of the measurement air A2 after being in contact with the light scattering particulate matter sensor 160 is not important, the insulation layer 125a may not be formed on the sensing passage 125 after the light scattering particulate matter sensor 160.

That is, the inflow passage 121, the heating passage 123, and the connecting passage 124 are designed to have a high antistatic performance, and the heating passage 123 and the connection passage 124 are preferably designed to have insulation performance as well as the antistatic performance.

The light scattering particulate matter sensor 160 is combined with the inner wall surface of the sensing passage 125 to measure particulate matter contained in the measurement air A2. The particulate matter measured by the light scattering particulate matter sensor 160 includes fine particulate matter having a particle diameter of 2.5 microns (μm) or less. The fine particulate matter concentration measured by the light scattering particulate matter sensor 160 is transmitted to the control unit 180 through a connector 181. The light scattering particulate matter sensor 160 may be implemented in various known forms.

The outlet block 113 is combined with the top of the sensing block 117. As illustrated in FIGS. 1 and 2, the outlet block 113 is fixedly coupled to the sensing block 117 and the heating block 115 using a first fastening member 113b.

The outlet block 113 has an outlet 113a, and an outlet passage 127 communicating with the sensing passage 125. The outlet passage 127 guides the measurement air A2 to the outlet 113a.

The outlet 113a may be formed in the same direction as the inlet 111a, or may be formed in the opposite direction. The outlet passage 127 may be bent from the outlet 113a so as to prevent rain or snow from flowing into the outlet 113a.

Figure 5:
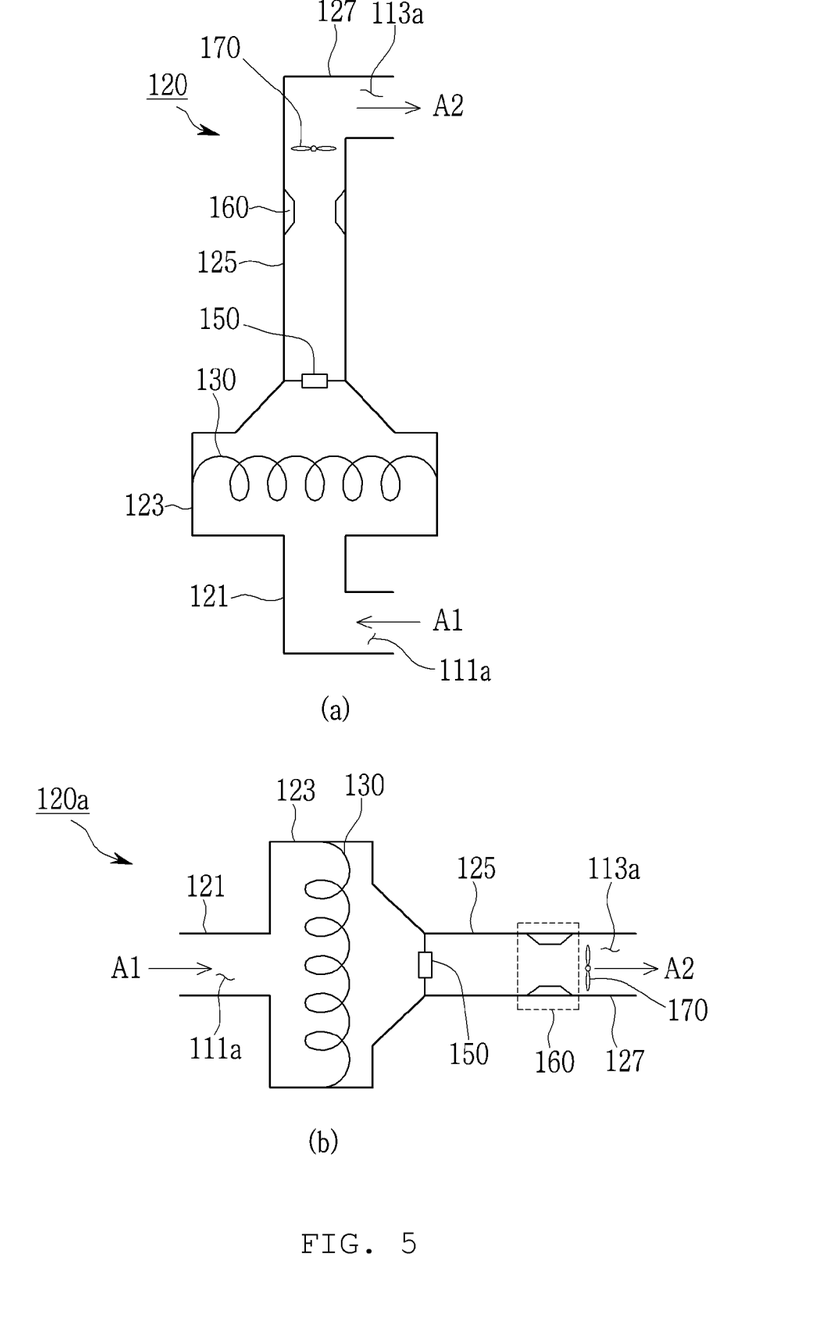
FIGS. 5 to 7 are views illustrating various modifications of an airflow passage of the light scattering particulate matter measuring apparatus according to the preferred embodiment of the present invention.
Figure 6:
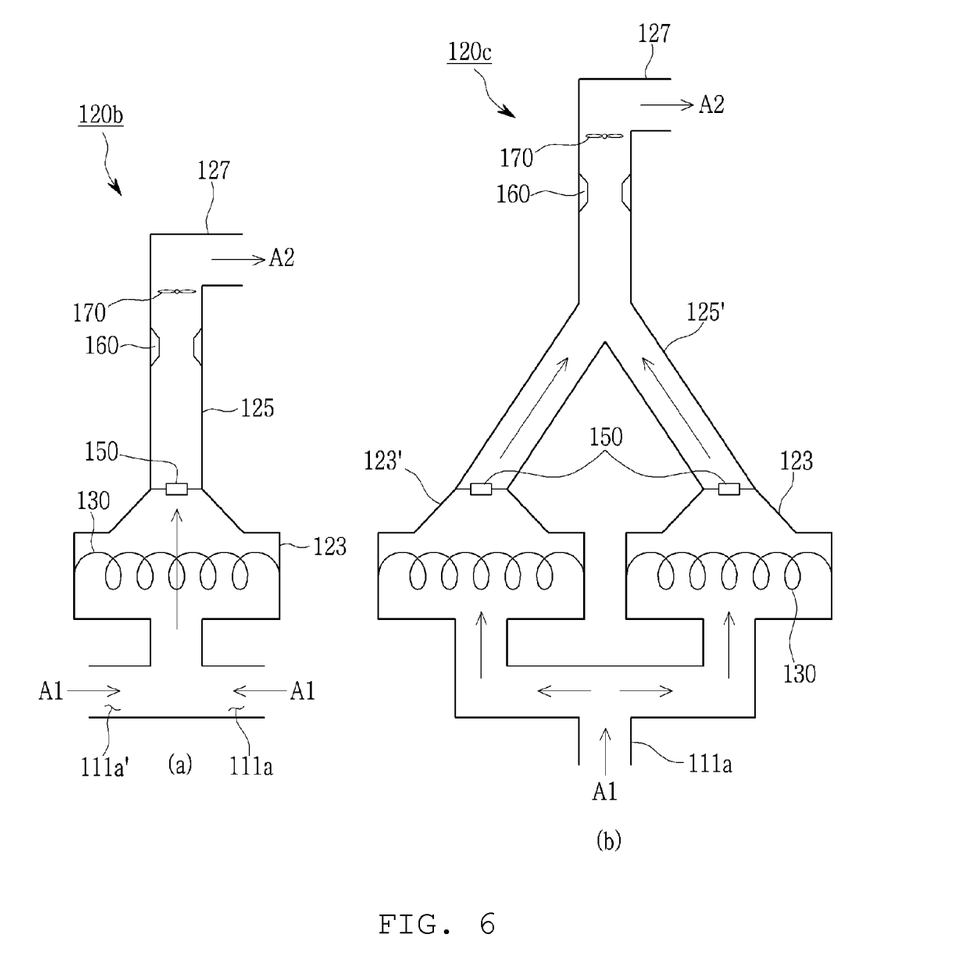
Figure 7:
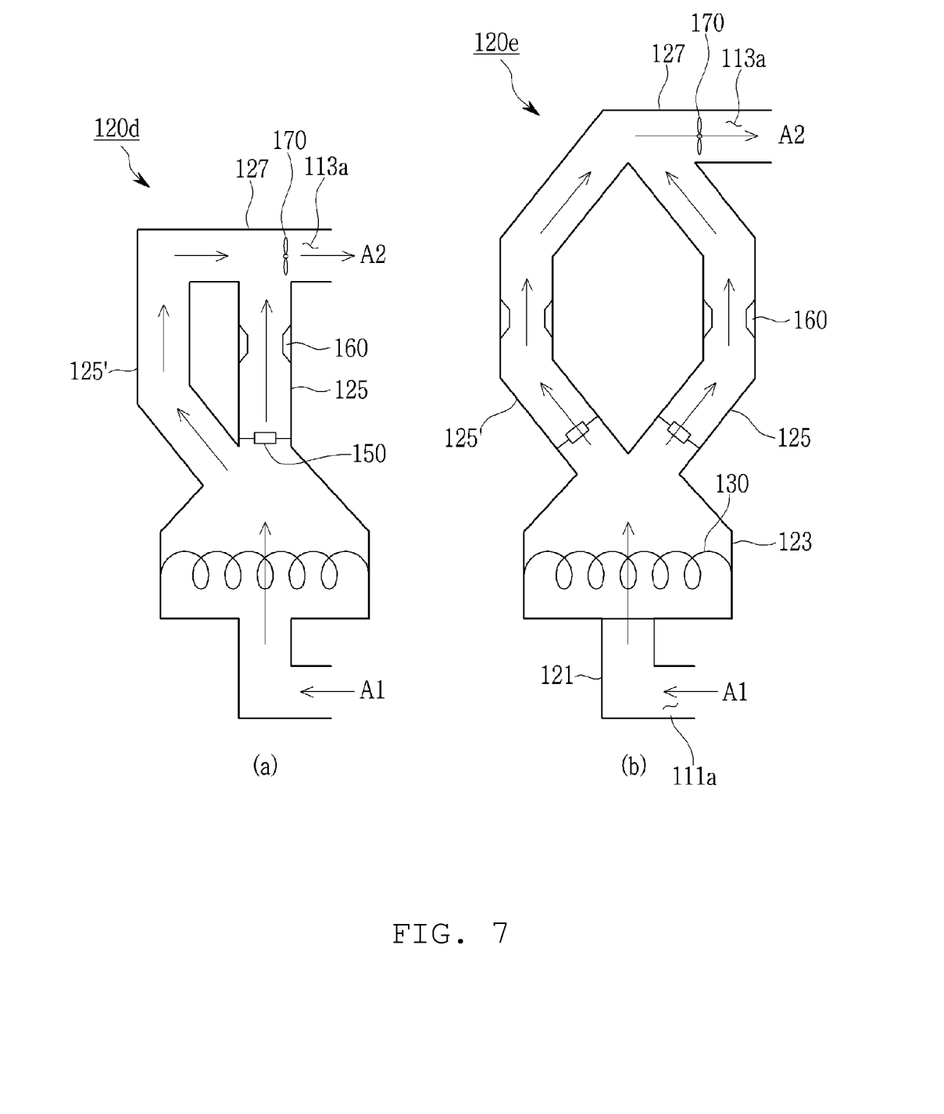

FIGS. 5 to 7 illustrate various modifications of the airflow passage 120 of the present invention.

FIG. 5 illustrates various directions of the air passage 120. As illustrated in FIG. 5A, the airflow passage 120 according to a preferred embodiment of the present invention includes an inlet 111a formed at a lower portion thereof and an outlet 113a formed at an upper portion thereof, and outside air flows upward from the lower portion.

As an occasion demands, the airflow passage 120a may include an inlet 111a formed on an upper portion thereof and an outlet 113a formed at a lower portion thereof so that the outside air flows downward from the upper portion to measure the concentration of particulate matter.

Meanwhile, as illustrated in FIG. 5B, an airflow passage 120b may have an inlet 111a formed at one side thereof and an outlet 113a formed at the other side so that the outside air A1 flows horizontally.

Here, the heater 130, the internal temperature humidity sensor 150, and the light scattering particulate matter sensor 160 are sequentially arranged from the inlet 111a to the outlet 113a regardless of the airflow direction of the airflow passages 120a and 120b.

The light scattering particulate matter measuring apparatus 100 according to the preferred embodiment of the present invention has one inlet 111a and one outlet 113a, and has one airflow passage 120 connecting the inlet 111a and the outlet 113a with each other.

On the other hand, as illustrated in FIG. 6A, an airflow passage 120c may have a plurality of inlets 111a and 111a'. The plurality of inlets 111a and 111a' may be formed in various directions of the inlet block 111, and may be merged into one inflow passage 121 so that the air flows, or may be moved along a plurality of independent heating passages 123 and 123' as illustrated in FIG. 6B.

Each of the plurality of independent heating passages 123 and 123' includes a heater 130 and an internal temperature-humidity sensor 150.

As illustrated in FIG. 6A, the measurement air A2 getting in contact with the heater 130 through the independent heating passages 123 and 123' moves along a sensing passage 125 merged into one, and then, may be discharged to the outside through an outlet passage 127 after concentration of particulate matter is measured in one light scattering particulate matter sensor 160.

As illustrated in FIGS. 7A and 7B, the independent heating passages 123 and 123' may be respectively connected with the sensing passages 125 and 125'.

In this instance, as illustrated in FIG. 7A, the internal temperature-humidity sensor 150 and the light scattering particulate matter sensor 160 are disposed in only one among the sensing passages 125 and 125'. Additionally, as illustrated in FIG. 7B, the internal temperature-humidity sensor 150 and the light scattering particulate matter sensor 160 may be disposed in all of the sensing passages 125 and 125'.

As illustrated in FIG. 7A, if the light scattering particulate matter sensor 160 is disposed in only one among the sensing passages 125 and 125', since an amount of measured air is varied, a process of correcting the measured particulate matter concentration is added.

Furthermore, the measurement air A2 passing through each of the sensing passages 125 and 125' may be discharged through one outlet passage 127 or may be individually discharged through the outlet passages 127 and a plurality of outlets 113a connected to the outlet passages 127 (not shown).

Meanwhile, as illustrated in FIGS. 7A and 7B, the airflow passages 120d and 120e has one heater 130, one heating passage 123, and a plurality of separated sensing passages 125 and 125'.

Additionally, all of the airflow passages 120 illustrated in FIGS. 5 to 7 have the inlets 111a and the outlets 113a which are illustrated in the same direction, but this is only an example, the inlets 111a and the outlets 113a may be arranged in opposite directions.

Besides the above, the airflow passage 120 may be modified in various forms within a range in which the inlet 111a and the outlet 113a are connected, and the outside air can pass sequentially through the heater 130, the internal temperature-humidity sensor 150, and the light scattering particulate matter sensor 160 as a closed route.

The control unit 180 uniformly maintains the internal temperature T2 or the internal relative humidity W2 of the measurement air A2 on the basis of the external temperature T1 or the external relative humidity W1 of the outside air A1 sensed by the external temperature-humidity sensor 140, so that the concentration of particulate matter measured by the light scattering particulate matter sensor 160 can be accurately measured regardless of the relative humidity.

As described above, when the relative humidity of the external temperature is high, water molecules evaporated in the air are absorbed into the particulate matter so that the particulate matter increases in volume. Furthermore, the light scattering particulate matter sensor 160 mistakes fine particulate matter for coarse particulate matter, thereby lowering accuracy in concentration measurement of the particulate matter.

When the external relative humidity W1 of the outside air A1 is higher than a predetermined target relative humidity Wt, the control unit 180 heats the outside air A1 by the heater 130 and operates the heater 130 so that the relative humidity W2 of the measurement air A2 is equal to the target relative humidity Wt.

The control unit 180 according to a preferred embodiment of the present invention sets the target relative humidity Wt to 35%. This was determined through various studies by reflecting that a particle diameter of fine particulate matter gets larger at relative humidity of about 30% and most of national measuring stations set the deliquescence relative humidity to 35%. The target relative humidity Wt may change according to situations.

When the target relative humidity Wt is set, the control unit 180 operates the heater 130 to control the relative humidity W2 of the measurement air A2 flowing along the heating passage 123 and the connection passage 124 to the target relative humidity Wt.

The control unit 180 controls the internal relative humidity W2 to reach the target relative humidity Wt using a control method, such as proportional-integral-derivative control (PID) in which the electric power of the heater 130 is increased when the internal relative humidity W2 measured by the internal temperature-humidity sensor 150 in real time is higher than the target relative humidity Wt, but when not so, the control unit 180 decreases the electric power of the heater 130.

Here, when the control unit 180 operates the heater 130 using the control method, the internal temperature T2 of the measurement air A2 flowing along the heating passage 123 and the connection passage 124 can exceed allowable safety temperature.

Therefore, the control unit 180 calculates the target temperature Tt using the following Equation 1, controls the operation of the heater 130 based on the calculated target temperature Tt, and controls in such a way that the internal temperature of the measurement air A2 does not exceed the safety temperature.

$$\text{Target temperature } Tt = A \times 237.3 / (7.5 - A), \quad \text{[Equation 1]}$$
$$A = \frac{7.5 \times T2}{237.3 + T2} + \log_{10}\left(\frac{W2}{Wt}\right),$$

wherein T2 is internal temperature, W2 is internal relative humidity, and Wt is target relative humidity.

When the target temperature Tt is calculated, the control unit 180 operates the heater 130 to heat the outside air A1 flowing through the heating passage 123 and to make the internal temperature T2 of the measurement air A2 reach the target temperature Tt.

Here, the manager further sets the safety temperature in addition to the target temperature Tt. The safety temperature means temperature which does not make the light scattering particulate matter measuring apparatus malfunction, or which does not cause a change in chemical composition of particulate matter or fine particulate matter.

The control unit 180 controls the heater 130 by an automatic control method, such as PID, so that the internal temperature T2 becomes the target temperature Tt calculated by Equation 1. However, if the calculated target temperature Tt exceeds a predetermined safety temperature, the control unit 180 controls the heater 130 by changing the target temperature Tt to the safe temperature.

In this process, if the internal temperature T2 measured by operating the heater 130 exceeds the safety temperature, the control unit 180 immediately cuts off the power supply to the heater 130.

The control unit 180 periodically updates the target temperature Tt by Equation 1 at a predetermined time interval, and controls the operation of the heater 130.

In the above Equation 1, the target temperature is calculated using the internal temperature T2, the internal relative humidity W2, and the target relative humidity Wt.

However, as occasion demands, the target temperature may be calculated using the external temperature T1, the external relative humidity W1, and the target relative humidity Wt measured by the external temperature-humidity sensor 140. In this case, the target temperature Tt may be calculated using Equation 2 below.

$$\text{Target temperature } (Tt) = A \times 237.3 / (7.5 - A), \quad \text{[Equation 2]}$$
$$A = \frac{7.5 \times T1}{237.3 + T1} + \log_{10}\left(\frac{W1}{Wt}\right),$$

wherein T1 is external temperature, Tt is target temperature, W1 is external relative humidity, and Wt is target relative humidity.

When the target temperature Tt is calculated using Equation 1, since the external relative humidity W1 and the external temperature T1 measured by the external temperature-humidity sensor 140 are not required, the external temperature-humidity sensor 140 is not required, and thus, the configuration of the system can be simplified.

The control unit 180 may selectively use any one of the two methods or may use the two methods interchangeably.

Meanwhile, when the heater 130 is operated to heat the internal temperature of the measurement air A2 to the target temperature, the control unit 180 corrects the particulate matter concentration measured by the light scattering particulate matter sensor 160.

When heated by the heater 130, the relative humidity W2 of the measurement air A2 is lower than the initial external relative humidity W1. Accordingly, the internal temperature T2 of the measurement air A2 flowing into the light scattering particulate matter sensor 160 is higher than the external temperature T1. As the temperature of the measurement air A2 increases, the volume of the measurement air A2 increases more than that of the outside air A1.

Since the particulate matter concentration is measured by the weight of particulate matter per unit volume of air, a process of correcting the particulate matter concentration value calculated by the increased volume is required.

Correction of the particulate matter value is performed by Equation 3 below.

Corrected particulate matter concentration=(particulate matter concentration measured in light scattering particulate matter sensor)×(273+internal temperature)/(273+external temperature) [Equation 3]

The particulate matter measuring process using the light scattering particulate matter measuring apparatus 100 according to the present invention will be described with reference to FIGS. 1 to 8.

The light scattering particulate matter measuring apparatus 100 of the present invention is installed at a measuring position. An inlet 111a is located at a lower portion of the casing 110, and an outlet 113a is located at an upper portion of the casing 110.

Figure 8:
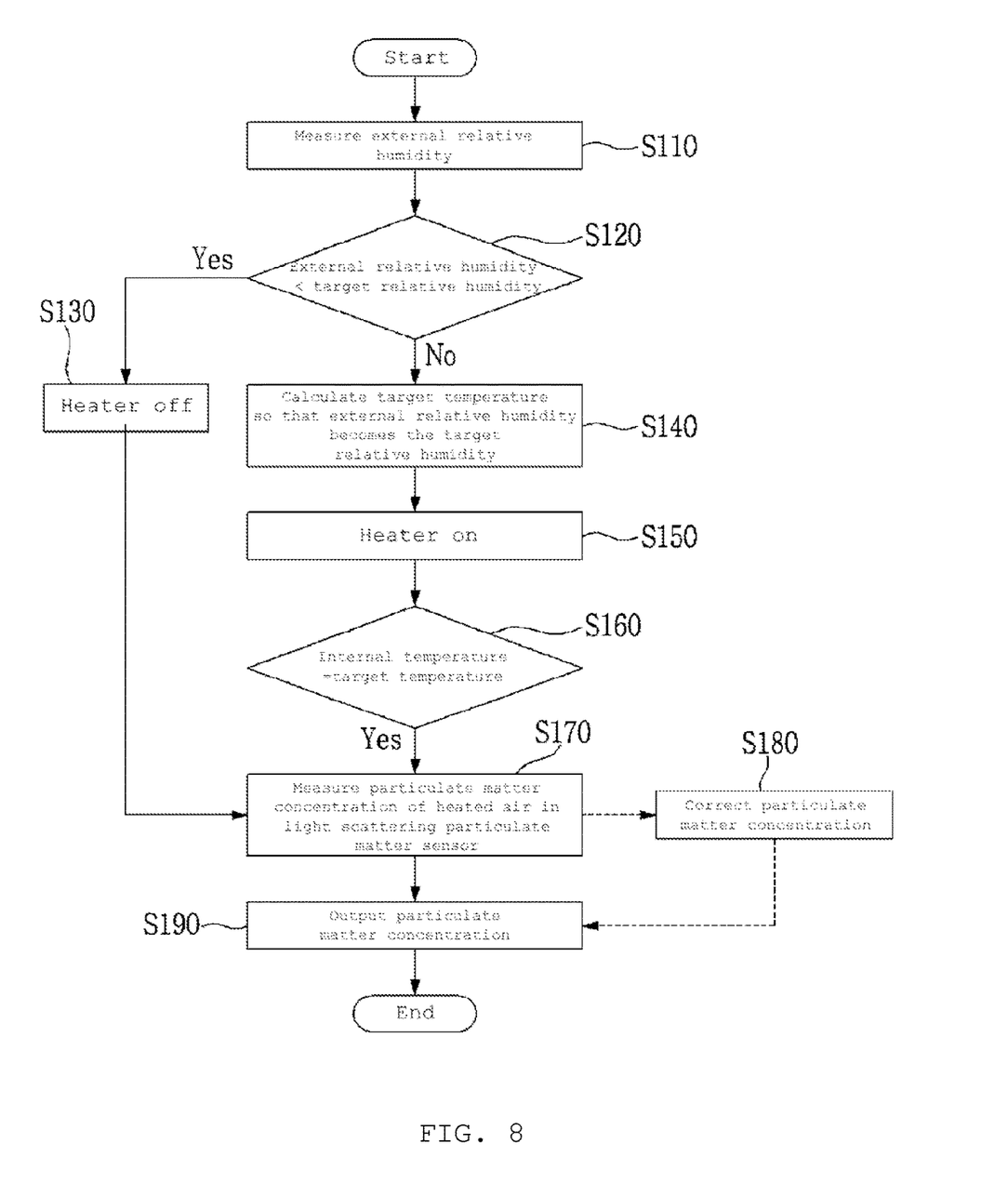
FIG. 8 is a flow chart illustrating a particulate matter measurement process of the light scattering particulate matter measuring apparatus according to the preferred embodiment of the present invention.

The external temperature-humidity sensor 140 located outside the casing 110 measures the external temperature T1 and the external relative humidity W1 of the outside air A1 and transmits the measured external temperature T1 and the external relative humidity W1 to the control unit 180 (S110). The control unit 180 determines whether the transmitted external relative humidity W1 is lower than the predetermined target relative humidity Wt (S120).

When the external relative humidity W1 is lower than the predetermined target relative humidity Wt, the control unit 180 cuts off the power supply to the heater 130 so that the heater 130 is not operated (S130).

The outside air A1 flows through the inlet 111a, and the outside air A1 is moved along the inflow passage 121 to the heating passage 123. In this instance, an antistatic layer 121a is formed on the inner wall surface of the inflow passage 121 to prevent the particulate matter from being adhered onto the inner wall surface by static electricity, and the outside air A1 introduced into the inlet 111a may be moved to the heating passage 123.

Accordingly, as illustrated in FIG. 2, the outside air A1 introduced into the inlet 111a flows along the inflow passage 121 and the heating passage 123, and is introduced into the light scattering particulate matter sensor 160 via the internal temperature-humidity sensor 150 in a non-heated state.

The particulate matter concentration of the outside air (measurement air) that is not heated in the light scattering particulate matter sensor 160 is measured, and the particulate matter concentration measured by the control unit 180 is transmitted (S170). The control unit 180 outputs the measured particulate matter concentration to the outside. (S190)

On the other hand, if the external relative humidity W1 is higher than the predetermined target relative humidity Wt, the control unit 180 calculates the target temperature at which the relative humidity becomes the target relative humidity (S140). The target temperature may be calculated by Equation 1 above.

When the target temperature is calculated, the control unit 180 supplies power to the heater 130 to operate the heater 130 (S150). The outside air A1 flowing into the heating passage 123 gets in contact with the heater 130 and is heated. The heated measurement air A2 gets in contact with the internal temperature-humidity sensor 150, and the internal temperature T2 or the internal relative humidity W2 is measured.

When the internal temperature T2 measured by the internal temperature-humidity sensor 150 is the same as the target temperature Tt, the internal temperature T2 is supplied to the sensing passage 125 to get in contact with the light scattering particulate matter sensor 160, and the particulate matter concentration is measured (S170).

When the particulate matter concentration is measured by the light scattering particulate matter sensor 160, the control unit 180 corrects the particulate matter concentration by Equation 3 (S180), and outputs the particulate matter concentration (S190).

As described above, the light scattering particulate matter measuring apparatus according to the present invention is capable of lowering relative humidity and increasing accuracy in concentration measurement of particulate matter by heating outside air by the heater when the relative humidity of the outside air is high.

In addition, an antistatic layer is formed on the inner wall surface of the airflow passage through which the outside air flows, or the airflow passage is made of an antistatic material. Accordingly, the light scattering particulate matter measuring apparatus according to the present invention can prevent particulate matter from adhering on the inflow passage by static electricity, thereby solving the problem that there is an error in the particulate matter measurement result.

Additionally, the light scattering particulate matter measuring apparatus according to the present invention has the insulation layer formed on the inner wall surface of the sensing flow passage extending from the heater to the light scattering particulate matter sensor, thereby minimizing heat loss of the measured air having the increased temperature and securing the reliability in the measurement result of the particulate matter concentration.

The technical thoughts of the present invention have been described hereinafter.

It is to be appreciated that those skilled in the art can change or modify the embodiments from the above description in various ways. Although it is not clearly illustrated or described herein, it is to be appreciated that those skilled in the art can change or modify the embodiments from the above description in various ways without departing from the scope and spirit of the present invention and such changes and modifications belong to the scope of the present invention. While the present invention has been described with reference to the particular illustrative embodiments, it is not to be restricted by the embodiments but only by the appended claims.

The invention claimed is:

1. A light scattering particulate matter measuring apparatus which measures particulate matter concentration in outside air in a light scattering method, the apparatus comprising:
   a casing provided with an inlet into which outside air flows, and an outlet through which measurement air is discharged, the particulate matter concentration of the measurement air having been measured;
   an airflow passage which connects the inlet and the outlet in the casing and through which outside air moves;
   a heater disposed in the airflow passage;
   a light scattering particulate matter sensor disposed in the airflow passage to measure concentration of particulate matter of the measurement air;
   an internal temperature-humidity sensor disposed in the airflow passage to measure temperature and relative humidity of the measurement air; and
   a control unit configured to control power supply to the heater based on the temperature and the relative humidity measured by the internal temperature-humidity sensor,
   wherein the light scattering particulate matter measuring apparatus is configured to be mounted such that the outlet is positioned to be more elevated than the inlet,
   wherein the light scattering particulate matter measuring apparatus is configured to measure particulate matter concentration in the outside air by using convective movement of the outside air in the airflow passage based on operation of the heater,
   wherein the heater, the internal temperature-humidity sensor, the light scattering particulate matter sensor are positioned sequentially in the airflow passage from the inlet to the outlet,
   wherein the control unit is configured to control electric power of the heater based on the relative humidity measured by the internal temperature-humidity sensor in order to heat the outside air, moving to the outlet based on the convective movement, to a target temperature for reaching a predetermined target relative humidity, and
   wherein the airflow passage including the light scattering particulate matter sensor is narrower than the airflow passage including the heater and the internal temperature-humidity sensor such that the convective movement of air in the airflow passage is increased and the particulate matter concentration is more accurately measured.

2. The light scattering particulate matter measuring apparatus according to claim 1,
   wherein an air flow fan is disposed on the airflow passage to forcedly move the outside air.

3. The light scattering particulate matter measuring apparatus according to claim 2, wherein the airflow passage includes a plurality of internal branch passages extending from the heater to the outlet, and
   wherein the internal temperature-humidity sensor and the light scattering particulate matter sensor are disposed in any one among the internal branch passages.

4. The light scattering particulate matter measuring apparatus according to claim 2, wherein the airflow passage includes a plurality of internal branch passages extending from the heater to the outlet, and
   wherein each of the plurality of internal branch passages includes the internal temperature-humidity sensor and the light scattering particulate matter sensor.

5. The light scattering particulate matter measuring apparatus according to claim 2, wherein the airflow passage further comprises: an inflow passage extending from the inlet to the heater, and an outlet passage extending from the light scattering particulate matter sensor to the outlet.

6. The light scattering particulate matter measuring apparatus according to claim 5, wherein insulation layers made of an insulation material are respectively disposed on inner wall surfaces of the heating passage and the sensing passage.

7. The light scattering particulate matter measuring apparatus according to claim 6, wherein antistatic layers made of an antistatic material are respectively disposed on surfaces of the inflow passage, the heating passage, and the sensing passage.

8. The light scattering particulate matter measuring apparatus according to claim 7, further comprising:
   an external temperature-humidity sensor disposed outside the casing to measure temperature and the relative humidity of the outside air,
   wherein the control unit operates the heater when an external relative humidity of the outside air measured by the external temperature-humidity sensor is higher than the predetermined target relative humidity, to heat the outside air until the external relative humidity of the outside air reaches a target relative humidity.

9. The light scattering particulate matter measuring apparatus according to claim 2, wherein the air flow fan is configured such that flow of air in a direction opposite to gravitational pull is generated at least in the sensing passage.

10. The light scattering particulate matter measuring apparatus according to claim 1, wherein the airflow passage is configured to channel air either upward or laterally but not downward.

* * * * *